United States Patent [19]

Andre

[11] Patent Number: 5,690,033
[45] Date of Patent: Nov. 25, 1997

[54] DEFORMABLE GANGWAY BETWEEN TWO LOADING PLATFORMS CARRIED BY SUCCESSIVE CHASSIS, NOTABLY PERTAINING TO RAILRODS

[75] Inventor: Jean-Luc Andre, Obernai, France

[73] Assignee: Lohr Industrie, Hangenbieten, France

[21] Appl. No.: 528,090

[22] Filed: Sep. 14, 1995

[30] Foreign Application Priority Data

Sep. 16, 1994 [FR] France ................... 94 11229

[51] Int. Cl.$^6$ ................... B61D 17/00
[52] U.S. Cl. ................... 105/3; 105/4.1; 105/8; 105/458; 414/339; 414/340; 410/53; 280/403
[58] Field of Search ................... 105/8.1, 355, 375, 105/425, 458, 3, 4.1; 414/339, 340, 343; 410/53, 27; 14/24, 69.5, 71.1; 280/403, 400, 404, 483

[56] References Cited

U.S. PATENT DOCUMENTS

| 4,869,178 | 9/1989 | Bechu et al. ................... 105/458 |
| 4,905,607 | 3/1990 | Wanneroy ................... 105/8.1 |
| 5,010,614 | 4/1991 | Braemert et al. ................... 14/71.1 |
| 5,471,935 | 12/1995 | Goebles et al. ................... 105/458 |

FOREIGN PATENT DOCUMENTS

| 3305062 | 8/1984 | Germany ................... 105/8.1 |
| 598156 | 2/1948 | United Kingdom ................... 105/8.1 |

*Primary Examiner*—S. Joseph Morano
*Attorney, Agent, or Firm*—Davis and Bujold

[57] ABSTRACT

A deformable gangway (14), located between two successive loading platforms (15) and (16) for a road or a railroad chassis, is composed of a succession of transverse slats (25), such as metallic transverse slats, carried adjacent their ends (39) by two longitudinal supporting and guiding elements (26) and (27). The slats (25) are disposed side by side and separated from one another, at least adjacent their ends (39), by inserts (43) made of an elastic material which bear against the longitudinal supporting and guiding elements (26) and (27). The slats (25) become immobilized, when subjected to a load, and form a fixed supporting area (17) while a remainder of the other slats (25) are still able to move on a curve, as a result of relative movement between adjacent end faces (20, 21) and (22, 23) of the platforms (15) and (16) to which the gangway (14) interconnects.

20 Claims, 6 Drawing Sheets

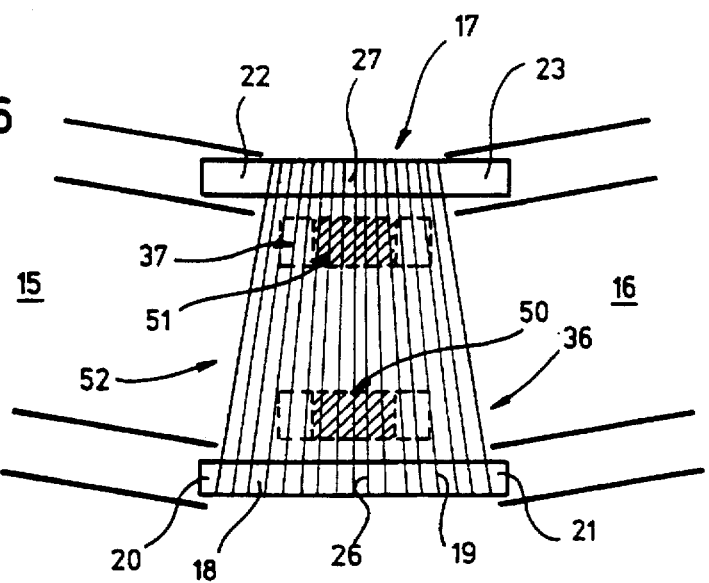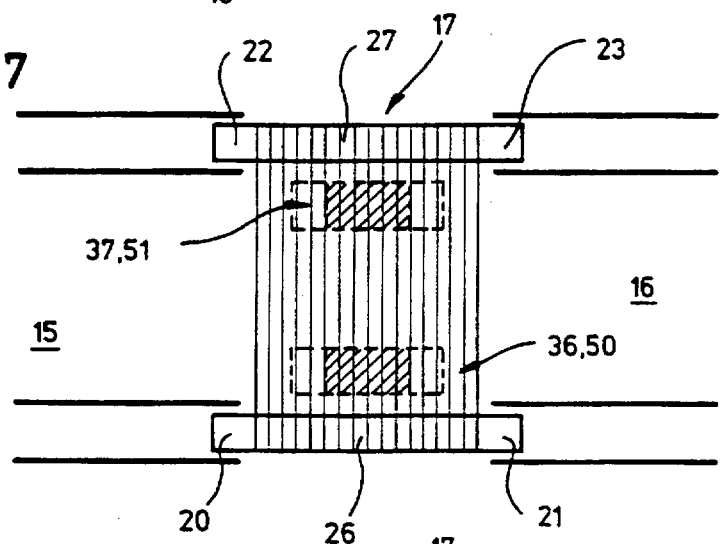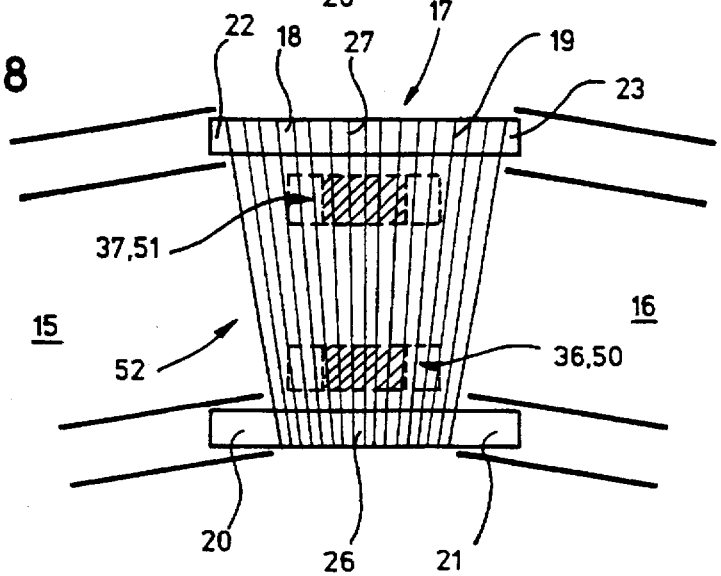

DEFORMABLE GANGWAY BETWEEN TWO LOADING PLATFORMS CARRIED BY SUCCESSIVE CHASSIS, NOTABLY PERTAINING TO RAILRODS

FIELD OF THE INVENTION

The present invention relates to a deformable gangway between the loading platforms or decks of two successive chassis, rail or road, articulated on each other and carrying a load, notably vehicles, said gangway being designed to be able to place the load anywhere on the loading platform including on said gangway.

TECHNOLOGICAL BACKGROUND OF THE INVENTION

The intensification of economic exchanges and a so-called "lean supply flow" industrial production strategy have greatly contributed to the increase in commercial road traffic during the last decade.

This new situation poses serious difficulties: saturation and deterioration of road infrastructures, increase in the number and severity of road accidents, ecological hazards and risks to public health because the transported products are often toxic and flammable.

To remedy these difficulties, many solutions have been considered. The solution most frequently put forward is of the "rail+road" type and consists of transporting the majority of goods by rail, only the trips between production and delivery sites and railroad loading and unloading sites still being covered by road.

It is proposed, for example, to build "railroad highways" consisting of long trains loaded with road haulage vehicles. Running the vehicle, for example an articulated vehicle of the tractor and semitrailer type or a truck with or without trailer, on the freight cars, requires a succession of carrier platforms or decks separated by a gangway, for example a floor element affording continuity of passage between two successive freight cars.

This floor element constitutes the pivoting extension of one of the loading platforms. It requires, to avoid tire damage, that the wheels should never rest in the immediate vicinity of the end of the other loading platform. This important limitation means that vehicles cannot be loaded without paying attention to their relative position with respect to the gangway.

The ease of operation being sought requires that it should not be necessary to worry about the presence of a reference mark of any sort or about any physical limitation that should be taken into account while loading the vehicles on the decks, that is to say there should be total independence between the position of the vehicles to be transported and that of the carrier platforms including the gangways.

Within the framework of the invention, it is desired to be able to load a maximum number of vehicles on board the road or rail convoy, one immediately following the other, without having to consider their position or that of their axles on the loading platform, or their overall length. In particular, it is desired to be able to support the axle of a transported vehicle, without tire damage, in line with the gangway affording continuity of passage between two successive carrier floors.

Referring to the solutions and means existing in the state of the art, it is necessary to avoid placing the wheels between the gangway and the freight car which is movable with respect thereto, otherwise the tires may be damaged as a result of the movements of the structures on curves.

If it is desired to be able to park at any point, with the constraint of ending up with a wheel positioned on a deformable area or an area where mobile structures overlap, the area supporting the wheels must be made independent of the movements on curves.

These conditions cannot be met with a simple gangway, even if pivoting in relation to a loading platform, because the wheels of the vehicle placed on the following chassis will slide on this gangway on curves, which may damage the tires, or even put the vehicle steering out of true.

OBJECT OF THE INVENTION

The present invention aims to overcome these drawbacks by providing a deformable gangway linking the decks of two carrier chassis, for example on a railroad highway, having a deformable connecting structure creating a fixed resting area under the load of the axle wheels of a vehicle situated anywhere on the loading platform of either one or the other of the carrier platforms or decks.

SUMMARY OF THE INVENTION

In general terms, the deformable gangway according to the invention is composed of a platform extending between two edge members, wherein a fixed supporting area is created under the effect of a load, for example through the axle wheels resting thereon, dividing this platform into two areas deforming on curves through the movements by which the ends of the carrier platforms or decks move closer together or further apart.

The interest of the invention relates to the provision of an area made fixed by the load and that remains fixed on curves, dividing the surface of the gangway into two deformable areas on curves.

More specifically, the deformable gangway is composed of a succession of transverse parallel slats, for example metallic, laid on edge, bearing through their ends on two longitudinal lateral supporting and guiding arms, with the interposition between the slats and, notably, between the ends of each slat, an insert made of plastic.

BRIEF DESCRIPTION OF THE DRAWINGS

The technical characteristics and other advantages of the invention are set out in the following description, given by way of non-limitative example in respect of one embodiment, with reference to the accompanying drawings, in which:

FIGS. 6 to 8 are simplified diagrams illustrating the operation of the components constituting the deformable gangway.

DETAILED DESCRIPTION OF THE ILLUSTRATED EMBODIMENTS

Figure 1:
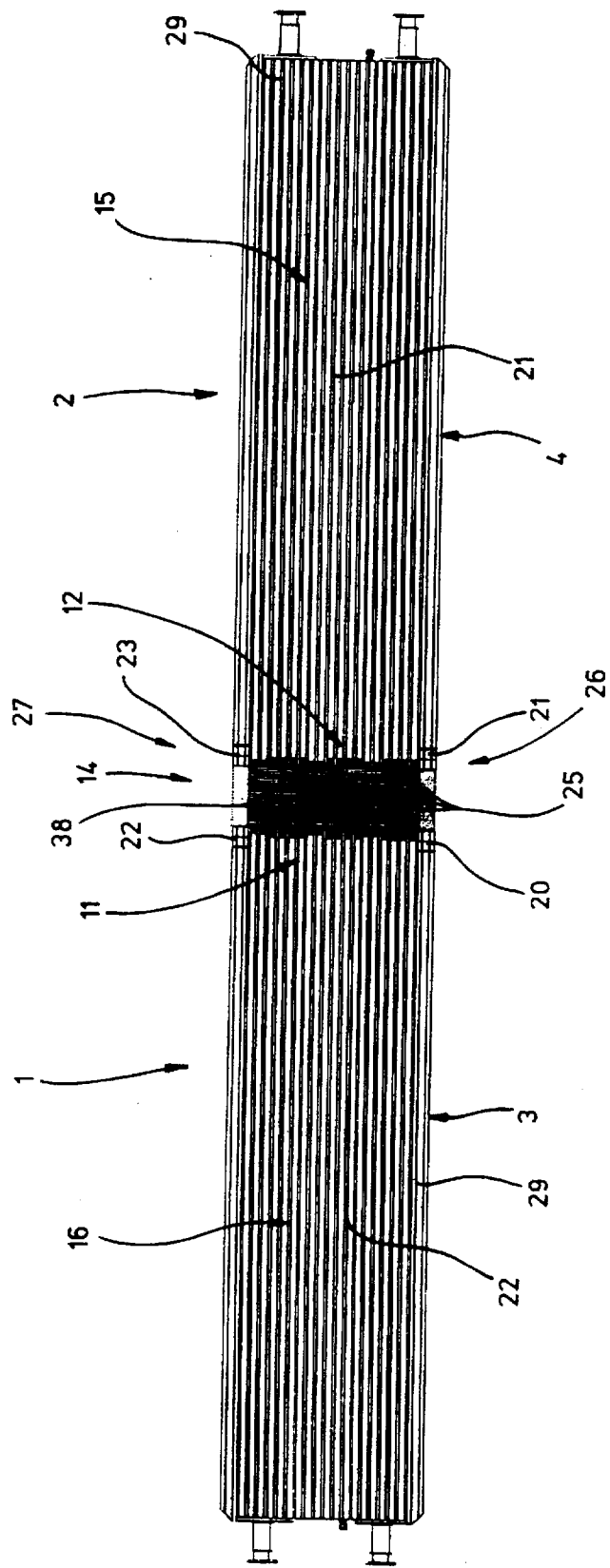
FIG. 1 is an overall plan view of two successive freight car structures each fitted with a deck and separated by the deformable gangway according to the invention.
Figure 2:
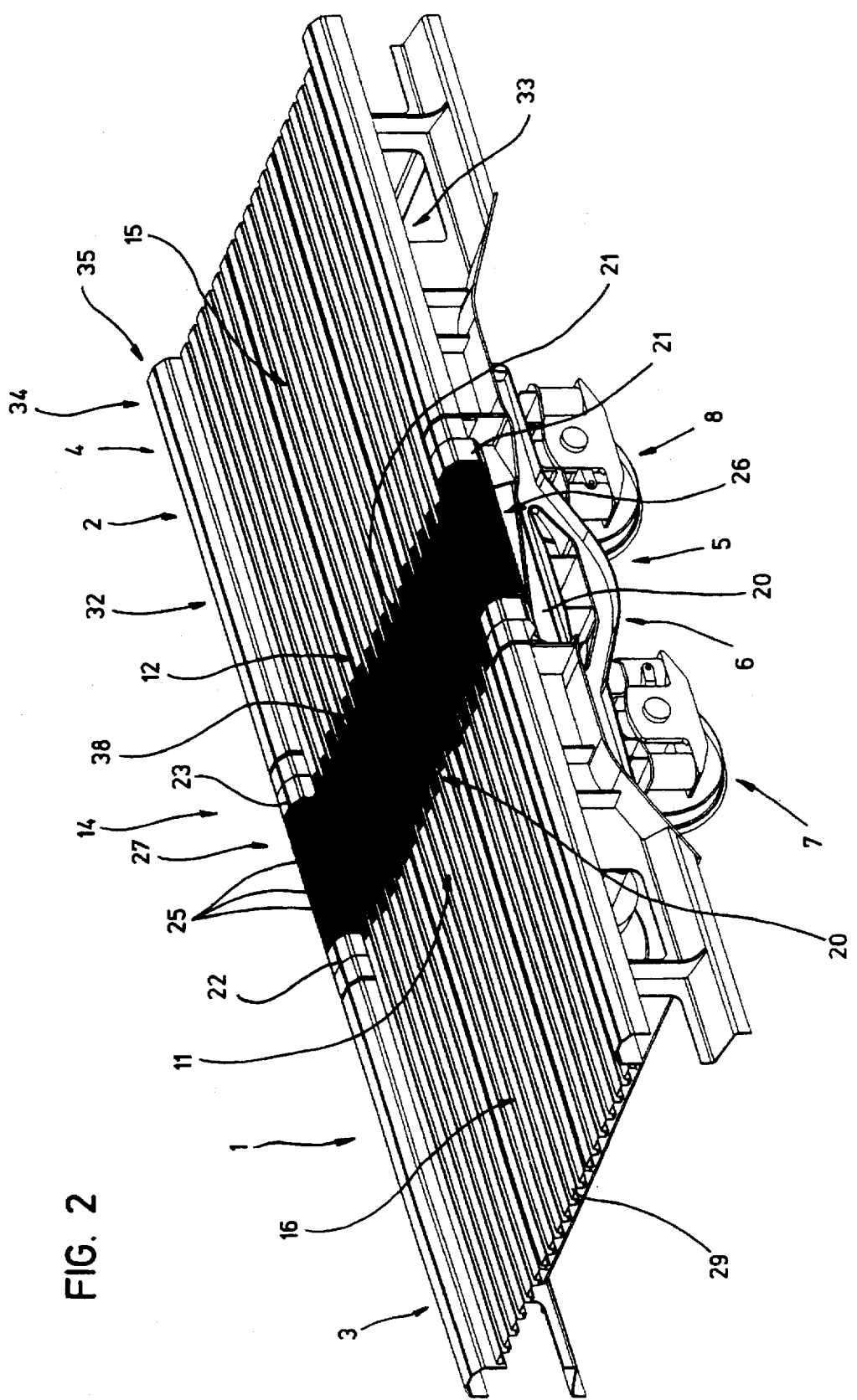
FIGS. 2 and 3 are perspective views illustrating the deformable gangway according to the invention in a straight line and on a curve.
Figure 3:
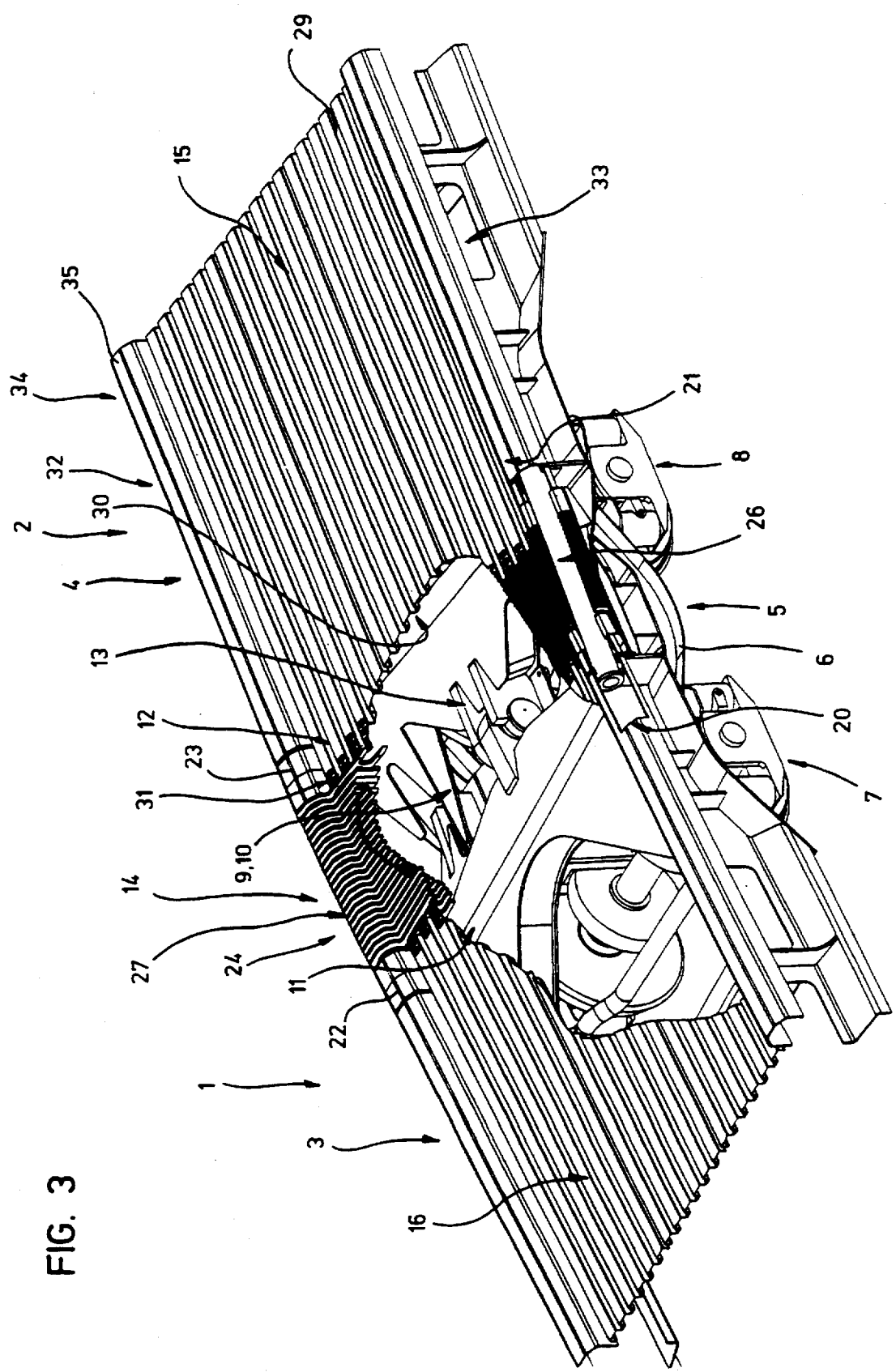
Figure 4:
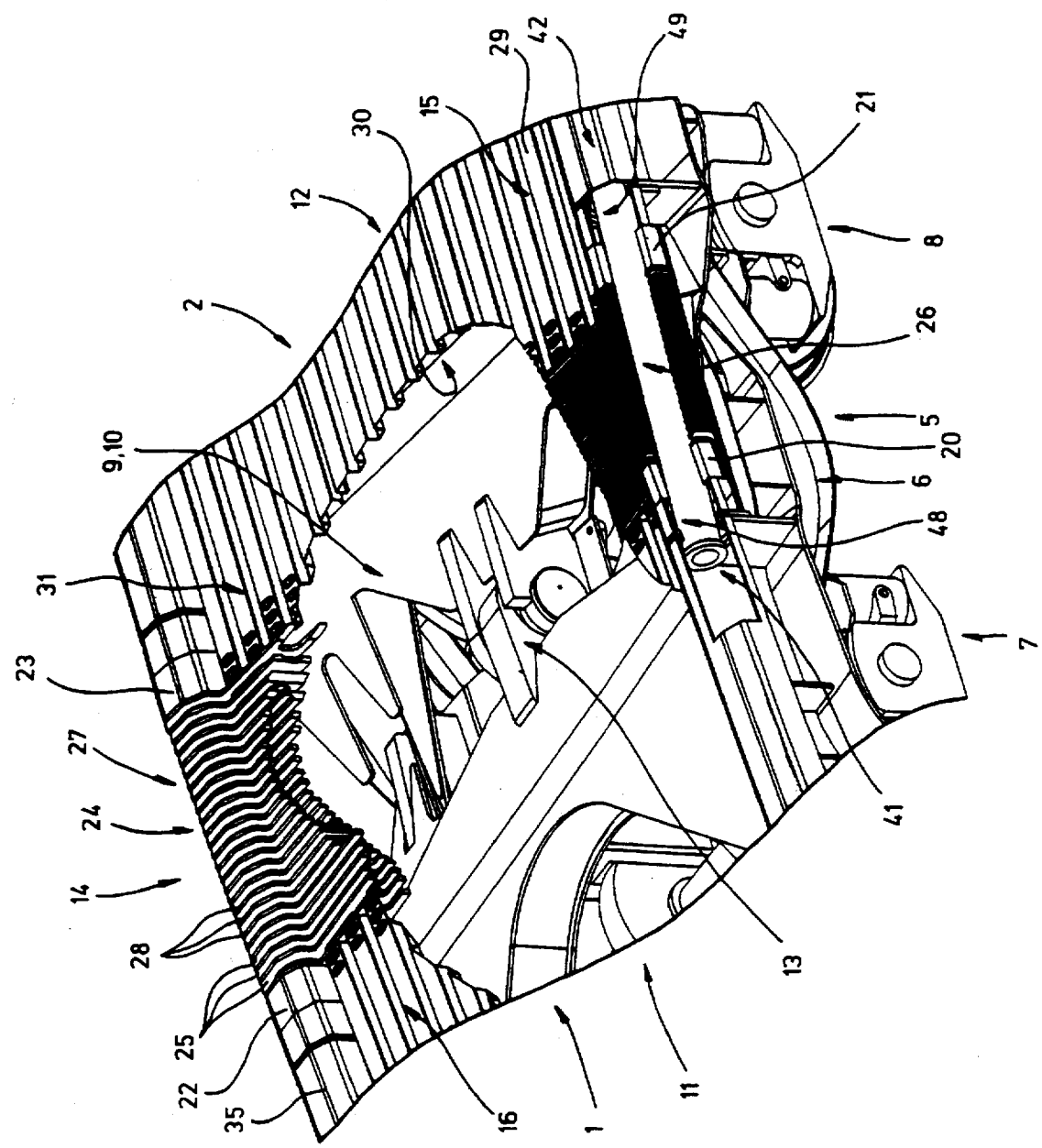
FIG. 4 is a detailed perspective view showing the constitution of the deformable gangway and its connection with the supporting and guiding arms.

Although the present invention does not relate exclusively to a passage between two railroad structures, a description will nevertheless be given below, as an example, of an application to trains used as railroad highways.

The trains intended to be used as railroad highways consist of a succession of freight car chassis 1 and 2 equipped with platforms 3 and 4 carrying a load. These chassis 1 and 2 are articulated on each other in a conventional manner and comprise known connecting members in the vicinity of their junction. They may rest on a common bogie or may each be equipped with its own axle and buffers.

The example depicted shows railroad bogies 5 of a known type, common to the two successive railroad chassis 1 and 2. Thus the bogie 5 has its own chassis 6, mounting suspended on two rail axles 7 and 8. In general terms, the chassis 6 of this common bogie 5 carries a complex central joint 9 called a pivot bearing 10 allowing steering pivoting on curves.

The ends 11 and 12 of the freight-car chassis 1 and 2 are articulated in a conventional manner on the mechanical assembly of the pivot bearing 10 and are linked together by a connecting joint 13.

The invention originates in the general inventive idea which consists of conceiving a deformable gangway 14 affording passage above the connecting joint 13 between two successive freight-car chassis 1 and 2 and continuity between the two carrier platforms or decks 15 and 16 that cover them, the deformable gangway 14 having the following general characteristics.

The constituent elements of this gangway 14 cooperate with each other so as to create, under the effect of a load, a fixed supporting area 17 remaining fixed on curves, and so as to keep, on each side of this fixed supporting area 17, adjacent areas 18 and 19 that are able to deform on curves in order to absorb, throughout the entire path, the contractions and extensions resulting from the relative movements of the adjacent corresponding ends 20, 21 and 22, 23 of the two successive carrier decks 15 and 16 connected by the gangway 14.

According to the embodiment described below, the deformable gangway 14 is formed from a longitudinal succession 24 of slats 25, for example metallic, with longitudinal cutouts, and having end extensions carried by longitudinal supporting and guiding elements 26 and 27 bordering the gangway 14. The fixed supporting area 17 is formed by those of the slats 25 that are under load, whilst the other slats 25 are free, and as a consequence their orientation may change on curves on each side of the fixed supporting area 17 so as to absorb the cornering movements and ensure continuity of the gangway 14. Interpolated shapes 28 made of elastic material can provide prestressing designed to limit vibrations and noise.

According to the first aspect of the invention, all the main traction and compression forces are transferred into the railroad structures proper, namely the freight-car chassis 1 and 2 and the bogies 5, and the carrier platforms or decks 15 and 16 receiving the load are mounted on them, for example a folded sheet metal platform 29 corrugated and perforated in corrugations 30 which are almost square and oblong stamped perforations 31 for improving adhesion and creating anchor points for the removable chocks or other load-immobilizing means. The useful surface of these carrier platforms or decks 15 and 16 is bordered, along each of its sides 32 and 33, by a structural return 34 shaped as a longitudinal shoulder 35 of a certain height, constituting a guide for vehicles moving during loading or unloading.

According to the invention, between each deck 15 and 16 and at the level of the common area 9 of articulation on the common bogie 5, there is provided, as a continuity interface between two successive decks 15 and 16, a deformable gangway 14 affording passage above the connecting joint 13, designed to prevent the forced sliding of the tires 36 and 37 on curves and, consequently, damage to them, said gangway also being designed to absorb the relative movements on curves of the opposite ends 20, 21 and 22, 23 of the decks 15 and 16.

According to the invention, the deformable gangway 14 has a number of non-loaded slats 25 sufficient to absorb the movements of the facing ends 20, 21 and 22, 23 of the adjacent decks 15 and 16 on curves and, in a preferred form, it has a length adapted to accept only one axle line.

According to another embodiment, the gangway 14 must be able to sink locally at one point in line with the tires 36 and 37 or on the fixed supporting area 17 for the wheels and, on each side of this fixed supporting area 17, exhibit sufficient deformation in extension and compression to allow opening in a fan shape with the apex to the right or left depending on the direction of the curve.

The purpose of the last figures is to illustrate this fan-shaped deformation diagrammatically.

According to a preferred embodiment described below, the deformable gangway 14 consists of a support platform 38 formed by a longitudinal succession of transverse slats 25, for example metallic, placed parallel and side by side over the entire length of the gangway 14.

Figure 5:
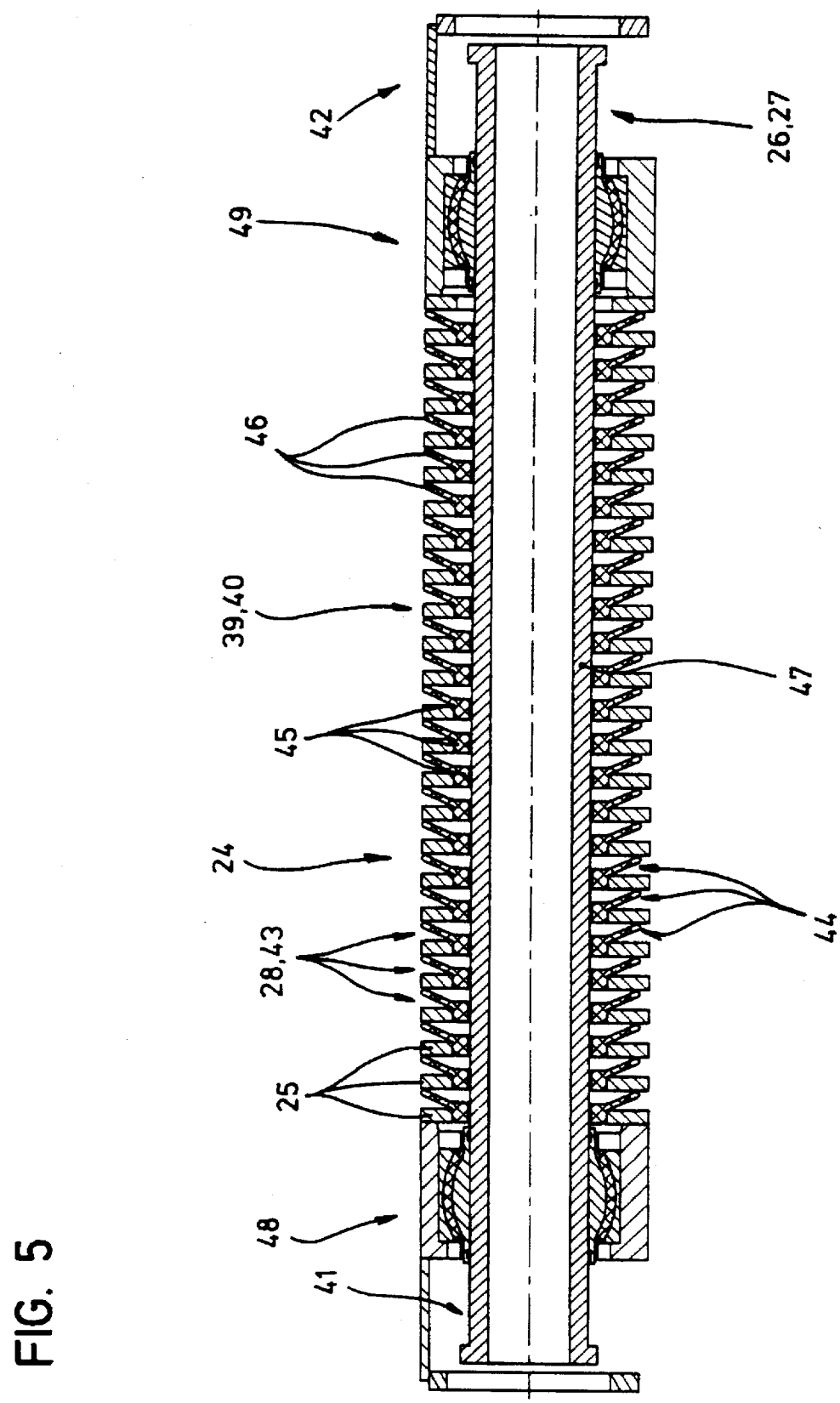
FIG. 5 is a view in longitudinal section along a supporting and guiding arm.

As can be seen more precisely in FIG. 5, these slats 25 are mounted by their ends 39, shaped like rings 40, on the two lateral parallel supporting and guiding elements 26 and 27 between which the gangway 14 extends. These supporting and guiding elements (arms) 26 and 27 with ends 41 and 42 are tubular in shape and disposed longitudinally in line with the edges of the adjacent decks 15 and 16. They serve to hold and guide the supporting slats 25 that are mounted directly on these supporting and guiding elements (arms) 26 and 27 or by means of interpolated shapes 28 made of elastic material.

In this last instance, these slates 25 are maintained parallel to one another and in position, laid on edge, by interposing between their ends 39 interpolated pieces 43 made of elastic material, for example frustoconical shims 44 with an end shoulder 45 and a tapered skirt 46, as depicted in the longitudinal section in FIG. 5, wherein the shoulder 45 of each shim 44 receives the end 39 of a slat 25, for example metallic, so as to wedge it.

To filter noise and vibrations, the series of ends 39 of the slats 25 with the interposition of the elastic shims 44 is mounted on the supporting and guiding elements 26 and 27 with elastic deformation prestressing through the more or less pronounced crushing of these shims.

As indicated, the lateral end parts of the gangway 14 bear on each side on the lateral supporting and guiding elements 26 and 27, which will be referred to hereinafter as supporting and guiding arms.

Each of these consists of a bar or longitudinal cylindrical tube 47 mounted by its ends 41 and 42 in the facing ends 20, 21 and 22, 23 of two successive decks 15 and 16 by means of bearing joints 48 and 49. These bearing joints must allow longitudinal movement, pivoting and the composition of these movements so as to transfer between the ends that they connect the rolling, pitching and hunting movements and the composition thereof, and allow the corresponding deformations of the gangway 14.

With regard to these bearing joints, they may be joints of the ball-and-socket joint or swivel type as depicted in FIG. 5.

The ends 39 of the slats 25 surround the supporting and guiding arms 26 and 27, but it may be a question of a simple attachment or the holding of an end in suitable elastic shapes. The aim is to give each of the slats 25 under load the possibility of being immobilized by contact with another surface, this, for example, after a flexion with or without lowering or suitable individual locking at the ends 39 of the slats 25.

Provision can thus be made for a simple direct bearing of the slats 25 at each of their ends 39 on or in a piece 28, 43 made of elastic material bearing on the supporting and guiding arms 26 and 27.

Hence the force due to the load applied to a slat 25 will have an effect on each of its ends 39. This force will cause the locking of the ends 39, for example by locking bearing on each of the supporting arms 26 and 27, whilst the non-loaded slats 25 will remain free to move at their ends 39.

Of course, other means for locking the ends 39 coming within the scope of the invention are possible. This notably in the version in which the bottom edge of the slats 25 comes into contact for immobilization with the chassis surface 6 or the surface of the connecting joint block and, in particular, with localised structures thereof.

Likewise, in general, but more specifically in the case of two freight cars, the buffers of the freight cars may be used as supporting and guiding arms 26 and 27, these buffers retaining their primary function. Elements having a shape close to that of the freight car buffers may be also used, fulfilling the above two functions.

Damage to the tires 36 and 37 of the truck wheels sliding on a deck 15, 16 subjected to lateral shifting movements on curves will be prevented or, at least, greatly reduced.

The functioning described below proves to be relatively simple. It relates to axle wheels, but may apply to any load.

The wheels on the same axle of a vehicle to be transported or any other load, each come into bearing contact with the deformable gangway 14 on an area 50, 51 of limited width that will become the fixed supporting area 17. This area extends transversely to the straight-line axis of the train because of the longitudinal position of the truck. It covers several slats 25 at the same time. Through the effect of the weight, the slats 25 underneath the load will be immobilized, for example by deforming, in order to come into contact with an extensive or localised supporting surface which is just lower or by becoming locked through each of their ends 39 under the effect of the load.

The supporting area thus created is the fixed supporting area 17 defined above, around which the gangway 14 deforms on curves.

These deformations will occur on each side of this fixed supporting area 17 in a fan-shape geometric form 52, as can be seen on the drawings. This is because the deformation forces resulting from taking a curve will have a simultaneous effect on the supporting and guiding arms 26 and 27, and the ends 39 of the slats 25 that are free, that is to say not under load, will move closer together on one side until in abutment or slightly compressing the interposed surfaces of elastic material and will move apart on the other side simply through the bringing-together or separation movement of the facing ends 20, 21 and 22, 23 of the decks 15 and 16.

The last figures illustrate the moving closer together of the ends 39 of the slats 25 at one side of the fixed supporting area 17 and their moving apart at the other side.

These movements will take place on the supporting and guiding arms 26 and 27 bordering the passage 14, and along them.

In other words, only the non-loaded slats 25 are free and hence mobile. They move freely until their lateral ends 39 come into abutment on the same side against the elastic inserts 43 to absorb movements of the facing ends 20, 21 and 22, 23 of the decks 15 and 16.

In the course of these movements, the interposed elastic shims 44 will fulfill the role of a spring under compression and then released.

The deformation on each side of the fixed supporting area 17 ensures that the tires 36 and 37 of the transported vehicles will not slide on the curves of the track, for example a railroad track, and will not give rise to a reaction because of the curve.

Moreover, it should be noted that when the train is travelling empty, no slat 25 is immobilized, which enables it to take tighter curves, and notably to use access tracks to maintenance depots.

To facilitate maintenance and repairs, the gangway 14 is made so as to be demountable from the adjacent decks 15 and 16, facilitating access to the connecting joint 13.

It should be stated here that the invention is not limited to the articulation passage between two consecutive railroad structures, but on the contrary extends to all articulated road vehicles carrying a load or transporting people.

What is claimed is:

1. A deformable gangway interconnecting two carrier platforms of two adjacent chassis with one another, said gangway extending over a connecting articulation between the two adjacent chassis to facilitate carrying a load located between the two interconnected carrier platforms;

wherein said gangway comprises two lateral connecting elements which are each connected with adjacent end portions of said two adjacent chassis, said two lateral connecting elements support a deformable structure therebetween, when an area of said deformable structure supports a load, said load supporting area becomes fixed, relative to said two lateral connecting elements, while a remaining unloaded area of said deformable structure remains movable, relative to said two lateral connecting elements, to compensate for contraction and expansion resulting from relative movement between said two adjacent end portions of said two carrier platforms during travel.

2. A deformable gangway according to claim 1, wherein said gangway lies in a plane which extends parallel to planes defined by said carrier platforms and said area which becomes fixed is a non-deformable area.

3. A deformable gangway according to claim 1, wherein said area which becomes fixed, under the effect of the load, results in an immobilization, at least on curves, of said area under load.

4. A deformable gangway according to claim 1, wherein said deformable structure comprises a plurality of parallel transversely arranged slats; and said area which becomes fixed results from a movement of at least one of said slats, under the effect of the load, toward engagement with said two lateral connecting elements to lock said at least one of said slats relative to said two lateral connecting elements.

5. A deformable gangway according to claim 1, wherein said deformable structure comprises a plurality of parallel transversely arranged slats; and said area which becomes fixed results from deformation and movement of at least one of said slats, under the effect of the load, toward engagement with said two lateral connecting elements to lock said at least one of said slats relative to said two lateral connecting elements.

6. A deformable gangway according to claim 1, wherein said load supporting area moves toward a supporting base of one of said two adjacent chassis, when subjected to the load, and said load supporting area is immobilized while abutting against said supporting base.

7. A deformable gangway according to claim 1, wherein a supporting base, for said deformable gangway, is formed by one or more supports at isolated points.

8. A deformable gangway according to claim 1, wherein said two lateral connecting elements comprise two supporting and guide arms, said gangway is formed by a succession of transversely arranged slats which are supported so as to allow relative movement of said transversely arranged slats along said supporting and guiding arms; and opposed ends of said supporting and guiding arms are moveable mounted relative to said adjacent end portions of said two adjacent chassis, via bearing joints supported by said adjacent end portions, to compensate for contraction and expansion resulting from relative movement between said two adjacent end portions of said two carrier platforms during travel.

9. A deformable gangway according to claim 1, wherein said deformable structure comprises a plurality of parallel transversely arranged slats, and said slats are formed from a metallic material.

10. A deformable gangway according to claim 9, wherein said two lateral connecting elements comprise two supporting and guide arms, and said metallic slats have cutouts therein which accommodate one of said supporting and guiding arms.

11. A deformable gangway according to claim 1, wherein said deformable structure comprises a plurality of parallel transversely arranged slats and said slats are immobilized by being at least partially separated from one another by the load.

12. A deformable gangway according to claim 1, wherein said deformable structure comprises a plurality of parallel transversely arranged slats, said two lateral connecting elements comprise two supporting and guide arms, and each opposed end of said slats is in direct contact with one of said supporting and guiding arms.

13. A deformable gangway according to claim 1, wherein said deformable structure comprises a plurality of parallel transversely arranged slats, said two lateral connecting elements comprise two supporting and guide arms, and said slats are deformable into contact with at least one of said supporting and guiding arms by flexing under the load.

14. A deformable gangway according to claim 1, wherein said deformable structure comprises a plurality of parallel transversely arranged slats, said two lateral connecting elements comprise two supporting and guide arms, and opposed ends of each said slat, when under the effect of the load, are in supporting and locking contact with one of said supporting and guiding arms, and an intermediate component couples said slat with said supporting and guiding arms.

15. A deformable gangway according to claim 1, wherein said deformable structure comprises a plurality of parallel transversely arranged slats, said two lateral connecting elements comprise two supporting and guide arms, and opposed ends of said slats, along with an intermediate body portion of said slats, are brought into supporting and locking contact with said supporting and guide arms under the effect of the load.

16. A deformable gangway according to claim 1, wherein said deformable structure comprises a plurality of parallel transversely arranged slats, and at least opposed ends of said slats are separated from extremities of adjacent slats by interposed pieces of elastic material.

17. A deformable gangway according to claim 1, wherein said deformable structure comprises a plurality of parallel transversely arranged slats, and said slats are separated from adjacent slats, over their entire length, by interposed pieces of elastic material.

18. A deformable gangway interconnecting two carrier platforms of two adjacent chassis with one another, said gangway extending over a connecting articulation between the two adjacent chassis to facilitate carrying a load located between the two interconnected carrier platforms;

wherein said gangway comprises two lateral connecting elements which are each connected with adjacent end portions of said two adjacent chassis, said two lateral connecting elements support a deformable structure therebetween, when an area of said deformable structure supports a load, said load supporting area becomes fixed, relative to said two lateral connecting elements, while a remaining unloaded area of said deformable structure remains movable, relative to said two lateral connecting elements, to compensate for contraction and expansion resulting from relative movement between said two adjacent end portions of said two carrier platforms during travel; and said deformable structure comprises a plurality of parallel transversely arranged slats, and elastic members support opposed extremities of said slats on said two lateral connecting elements, and said elastic members each include a shim with a frusto-conical skirt and an end shoulder, and said shim is mounted so as to provide a wedging action to separate adjacent slats from one another.

19. A deformable gangway interconnecting two carrier platforms of two adjacent chassis with one another, said gangway extending over a connecting articulation between the two adjacent chassis to facilitate carrying a load located between the two carrier platforms, wherein said gangway comprises a plurality of parallel transversely arranged slats which are supported by a pair of longitudinally arranged spaced apart parallel supporting and guide arms extending between end portions of the two carrier platforms; said plurality of parallel transversely arranged slats are each moveable along said pair of spaced apart supporting and guide arms to compensate for relative movement between said adjacent end portions of the two carrier platforms during travel of said adjacent chassis; and, when a load rests on one or more of said slats, each said slat supporting the load become fixed, relative to said pair of spaced apart supporting and guide arms, while a remainder of said slats, which are unloaded, remain moveable to compensate for the relative movement between adjacent end portions of the two carrier platforms during travel.

20. A deformable gangway according to claim 19, wherein elastic members interconnect opposed extremities of said slats with said two lateral connecting elements, and said elastic members each comprise a shim which has a frusto-conical skirt and an end shoulder, and each said elastic member supports one of said slats so as to provide a wedging action to separate adjacent slats from one another.

* * * * *